United States Patent
Quan et al.

(10) Patent No.: US 8,830,944 B1
(45) Date of Patent: Sep. 9, 2014

(54) METHOD FOR ACKNOWLEDGING RLC DATA PACKET TRANSMISSION AND RLC AM ENTITY SENDER

(71) Applicant: Huawei Technologies Co., Ltd., Shenzhen (CN)

(72) Inventors: Wei Quan, Beijing (CN); Yi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/285,295

(22) Filed: May 22, 2014

Related U.S. Application Data

(63) Continuation of application No. PCT/CN2012/085237, filed on Nov. 26, 2012.

(30) Foreign Application Priority Data

Nov. 24, 2011 (CN) .......................... 2011 1 0378143
Jan. 31, 2012 (CN) .......................... 2012 1 0021900

(51) Int. Cl.
*H04W 4/00* (2009.01)
*H04L 5/00* (2006.01)
*H04J 3/16* (2006.01)

(52) U.S. Cl.
CPC .................... *H04L 5/0055* (2013.01)

USPC .......................................... 370/329; 370/469

(58) Field of Classification Search
CPC combination set(s) only.
See application file for complete search history.

(56) References Cited

U.S. PATENT DOCUMENTS

| | | | |
|---|---|---|---|
| 2004/0184434 A1* | 9/2004 | Sebire et al. | 370/349 |
| 2010/0008269 A1* | 1/2010 | Chun et al. | 370/310 |
| 2010/0220594 A1* | 9/2010 | Racz et al. | 370/235 |
| 2010/0238803 A1* | 9/2010 | Racz et al. | 370/235 |
| 2011/0305182 A1* | 12/2011 | Suzuki et al. | 370/311 |
| 2012/0057560 A1* | 3/2012 | Park et al. | 370/329 |
| 2012/0163315 A1* | 6/2012 | Govindappa et al. | 370/329 |
| 2013/0215855 A1* | 8/2013 | Park et al. | 370/329 |
| 2013/0279490 A1* | 10/2013 | Pani et al. | 370/346 |

* cited by examiner

*Primary Examiner* — Clemence Han
(74) *Attorney, Agent, or Firm* — Slater & Matsil, L.L.P.

(57) ABSTRACT

The present invention provides a method for acknowledging RLC data packet transmission and an RLC AM entity sender. In embodiments of the present invention, an RLC AM entity sender sends an RLC data packet, which includes first indication information, to an RLC AM entity receiver through a sender MAC entity and a receiver MAC entity. The RLC AM entity receiver is instructed not to feed back acknowledgment information of the RLC data packet. Local acknowledgment information of the RLC data packet that is fed back by the sender MAC entity is received, so that the RLC AM entity sender can determine whether the transmission of the transmitted packet is successful.

20 Claims, 3 Drawing Sheets

METHOD FOR ACKNOWLEDGING RLC DATA PACKET TRANSMISSION AND RLC AM ENTITY SENDER

This application is a continuation of International Application No. PCT/CN2012/085237, filed on Nov. 26, 2012, which claims priority to Chinese Patent Application No. 201110378143.2, filed on Nov. 24, 2011 and Chinese Patent Application No. 201210021900.5, filed on Jan. 31, 2012, all of which are hereby incorporated by reference in their entireties.

TECHNICAL FIELD

The present invention relates to a communications technology and, in particular embodiments to a method for acknowledging radio link control data packet transmission and an RLC acknowledgment mode entity sender.

BACKGROUND

With the development of communications technologies, an increasing number of intelligent applications, such as instant messaging software and the MicroBlog, are integrated on a user equipment. In the foregoing intelligent applications, in a transmission process of an RLC data packet of the user equipment, when receiving or not receiving an RLC data packet sent by an RLC AM entity sender, a radio link control (RLC for short) acknowledged mode (AM for short) entity receiver returns acknowledgment information, for example, acknowledgment (ACK for short) or negative acknowledgment (NACK for short).

However, in order to transmit the acknowledgment information corresponding to the RLC data packet, great signaling overhead is generated, for example, before downlink acknowledgment information is transmitted, signaling such as physical downlink control channel (PDCCH for short) scheduling information is generated. Before uplink acknowledgment information is transmitted, signaling such as a scheduling request (SR for short), a buffer status report (BSR for short), and PDCCH scheduling information is generated. This leads to a waste of transmission resources.

SUMMARY OF THE INVENTION

The present invention provides a method for acknowledging RLC data packet transmission and an RLC AM entity sender, which are used to reduce signaling overhead and save transmission resources.

In one aspect, a method for acknowledging RLC data packet transmission is provided. An RLC AM entity sender sends an RLC data packet to an RLC AM entity receiver through a sender MAC entity and a receiver MAC entity. The RLC data packet includes first indication information and the first indication information is used to instruct the RLC AM entity receiver not to feed back acknowledgment information of the RLC data packet. The RLC AM entity sender receives local acknowledgment information of the RLC data packet that is fed back by the sender MAC entity. The local acknowledgment information of the RLC data packet is generated by the sender MAC entity according to acknowledgment information of a MAC data packet to which the RLC data packet belongs. The acknowledge information of the MAC data packet is fed back by the receiver MAC entity. The local acknowledgment information of the RLC data packet is fed back by the sender MAC entity according to obtained second indication information and the second indication information is used to instruct the sender MAC entity to feed back the local acknowledgment information of the RLC data packet to the RLC AM entity sender.

In another aspect, an RLC AM entity sender is provided. A sending unit is configured to send an RLC data packet to an RLC AM entity receiver through a sender MAC entity and a receiver MAC entity. The RLC data packet includes first indication information and the first indication information is used to instruct the RLC AM entity receiver not to feed back acknowledgment information of the RLC data packet. A receiving unit is configured to receive local acknowledgment information of the RLC data packet that is fed back by the sender MAC entity. The local acknowledgment information of the RLC data packet is generated by the sender MAC entity according to acknowledgment information of a MAC data packet to which the RLC data packet belongs. The acknowledge information of the MAC data packet is fed back by the receiver MAC entity. The local acknowledgment information of the RLC data packet is fed back by the sender MAC entity according to obtained second indication information. The second indication information is used to instruct the sender MAC entity to feed back the local acknowledgment information of the RLC data packet to the RLC AM entity sender.

It can be known from the foregoing technical solutions, in embodiments of the present invention, an RLC AM entity sender sends an RLC data packet including first indication information to an RLC AM entity receiver through a sender MAC entity and a receiver MAC entity instructs the RLC AM entity receiver not to feed back acknowledgment information of the RLC data packet and receives local acknowledgment information of the RLC data packet that is fed back by the sender MAC entity. In this way, the RLC AM entity sender can determine whether the transmission of the transmitted packet is successful. This can avoid a problem in the prior art that great signaling overhead is generated due to transmission of acknowledgment information corresponding to an RLC data packet, thereby reducing signaling overhead and saving transmission resources.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
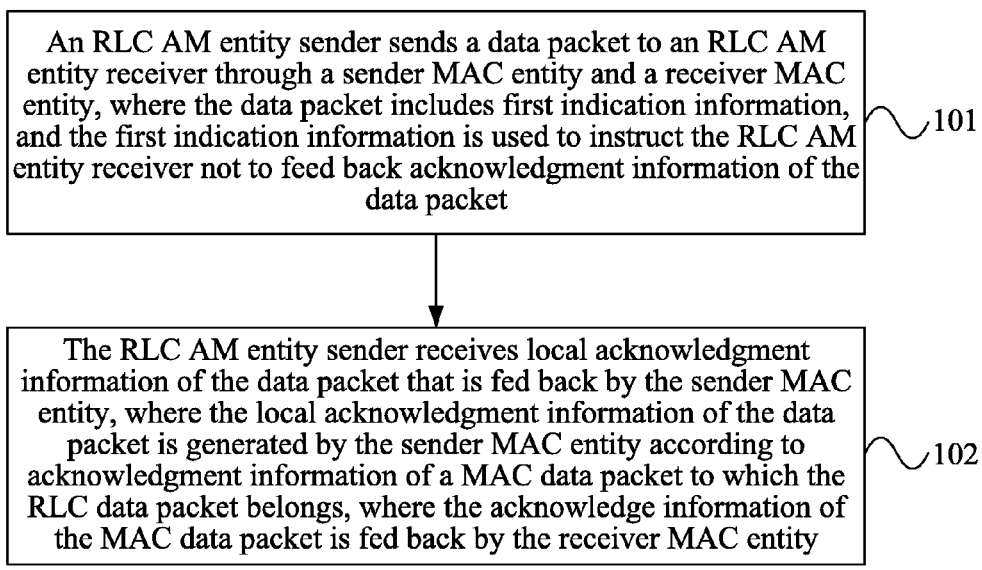
FIG. 1 is a schematic flowchart of a method for acknowledging RLC data packet transmission according to an embodiment of the present invention.

FIG. 1 is a schematic flowchart of a method for acknowledging RLC data packet transmission according to an embodiment of the present invention. As shown in FIG. 1, the method for acknowledging RLC data packet transmission in this embodiment may include the following steps.

101: An RLC AM entity sender sends an RLC data packet to an RLC AM entity receiver through a sender medium access control (MAC for short) entity and a receiver MAC entity. The RLC data packet includes first indication information and the first indication information is used to instruct the RLC AM entity receiver not to feed back acknowledgment information of the RLC data packet.

Specifically, the RLC data packet may include an RLC AM data (AMD for short) protocol data unit (PDU for short) or an RLC AMD PDU segment.

Optionally, the RLC data packet including first indication information may be specifically implemented in, but not limited to, the following manners.

Manner 1: The RLC data packet includes a polling indication domain, where when a value of the polling indication domain (for example, a P domain) is a first value (for example, 0), it indicates feedback prohibited; when the value of the polling indication domain is a second value (for example, 1), it indicates polling.

Specifically, the RLC AM entity sender may add no polling (poll) indication into an RLC data packet to be sent, that is, set a P domain in the RLC data packet to 0, which is used to instruct the RLC AM entity receiver not to feed back acknowledgment information of the RLC data packet. A method for adding no polling into an RLC data packet to be sent may include: setting, by the RLC AM entity sender, values of a counter PDU_WITHOUT_POLL and a counter BYTE_WITHOUT_POLL to 0, thereby setting the P domain to 0. The first indication information is that the P domain is set to 0.

Manner 2: The RLC data packet includes a feedback prohibition indication.

Specifically, the RLC AM entity sender may add a new domain into the RLC data packet to be sent, instructing the RLC AM entity receiver not to feed back the acknowledgment information of the RLC data packet. For example, the new domain is set to 1, indicating that the RLC AM entity receiver is instructed not to feed back the acknowledgment information of the RLC data packet, and the new domain is set to 0, indicating that the RLC AM entity receiver is instructed to stop prohibition of feeding back the acknowledgment information of the RLC data packet, or vice versa. It can be understood that, in this embodiment, if the RLC data packet received by the RLC AM entity receiver includes the foregoing added new domain, the RLC AM entity receiver may first read the new domain, if a value of the new domain is "instructing the RLC AM entity receiver not to feed back the acknowledgment information of the RLC data packet", the RLC AM entity receiver no longer reads a P domain. If the value of the new domain is "instructing the RLC AM entity receiver to stop prohibition of feeding back the acknowledgment information of the RLC data packet", the RLC AM entity receiver continues to read the P domain, and performs a subsequent operation according to the P domain.

Optionally, before 101, the RLC AM entity sender may further receive third indication information sent by a radio resource control (RRC for short) layer, where the third indication information is used to instruct the RLC AM entity sender to prohibit the RLC AM entity receiver from feeding back the acknowledgment information of the RLC data packet. The third indication information is sent by the RRC layer according to obtained fourth indication information, and the fourth indication information is used to instruct the RLC AM entity sender to prohibit the RLC AM entity receiver from feeding back the acknowledgment information of the RLC data packet.

Correspondingly, in 101, the RLC AM entity sender may send the RLC data packet to the RLC AM entity receiver through the sender MAC entity and the receiver MAC entity according to the third indication information.

It should be noted that, the fourth indication information may be specific to a radio bearer (RB for short), or may be specific to a user equipment. If specific to an RB, an RLC AM entity sender corresponding to the RB may be instructed to prohibit a corresponding RLC AM entity receiver from feeding back the acknowledgment information of the RLC data packet; and if specific to a user equipment, all RLC AM entity senders of the user equipment may be instructed to prohibit a corresponding RLC AM entity receiver from feeding back the acknowledgment information of the RLC data packet.

Optionally, the RRC layer may specifically obtain the fourth indication information by using a dedicated message. The dedicated message may be an existing RRC message. That is, a new field is added to the existing RRC message, or may be a new RRC message, which is not limited in this embodiment. For example, assuming that the RLC AM entity sender is located in a user equipment and the RLC AM entity receiver is located in a base station, the base station may send an RRC message to the user equipment. The RRC message includes the fourth indication information. After receiving the RRC message sent by the base station, an RRC layer of the user equipment may send the third indication information to the RLC AM entity sender according to the fourth indication information included in the RRC message. The foregoing RRC message may include but is not limited to an RRC connection setup message, an RRC connection reconfiguration message, or an RRC connection reestablishment message.

102: The RLC AM entity sender receives local acknowledgment information of the RLC data packet that is fed back by the sender MAC entity. The local acknowledgment information of the RLC data packet is generated by the sender MAC entity according to acknowledgment information of a MAC data packet to which the RLC data packet belongs. The acknowledge information of the MAC data packet is fed back by the receiver MAC entity. The local acknowledgment information of the RLC data packet is fed back by the sender MAC entity according to obtained second indication information and the second indication information is used to instruct the sender MAC entity to feed back the local acknowledgment information of the RLC data packet to the RLC AM entity sender.

Optionally, in another embodiment of the present invention, the RLC AM entity sender may further send the second indication information to the sender MAC entity.

Optionally, in another embodiment of the present invention, the RRC layer may send the second indication information to the sender MAC entity according to fifth indication information. The fifth indication information is used to instruct the sender MAC entity to feed back the local acknowledgment information of the RLC data packet to the RLC AM entity sender. Optionally, the RRC layer may specifically obtain the fifth indication information by using a dedicated message, where the dedicated message may be an existing RRC message, that is, a new field is added to the existing RRC message, or may be a new RRC message, which is not limited in this embodiment. For example, assuming that the RLC AM entity sender and the sender MAC entity are located in a user equipment, and the RLC AM entity receiver is located in a base station, the base station may send an RRC message to the user equipment, where the RRC message includes the fifth indication information. After receiving the RRC message sent by the base station, an RRC layer of the user equipment may send the second indication information to the sender MAC entity according to the fifth indication information included in the RRC message. The foregoing RRC message may include but is not limited to an RRC connection setup message, an RRC connection reconfiguration message, or an RRC connection reestablishment message.

It can be understood that, the fourth indication information and the fifth indication information in this embodiment may further be same indication information, and the indication information is used to instruct the RLC AM entity sender to prohibit the RLC AM entity receiver from feeding back acknowledgment information of the RLC data packet, and instruct the sender MAC entity to feed back the local acknowledgment information of the RLC data packet to the RLC AM entity sender.

In 102, the sender MAC entity may specifically generate the local acknowledgment information of the RLC data packet according to the acknowledgment information of the MAC data packet to which the RLC data packet belongs, where the acknowledgment information of the MAC data packet is fed back by the receiver MAC entity. For example, if the sender MAC entity receives acknowledgment information (ACK) of the MAC data packet to which the RLC data packet belongs, where the acknowledgment information is fed back by the receiver MAC entity, the sender MAC entity generates local acknowledgment information (Local ACK), indicating that the transmission of the RLC data packet is successful. If the sender MAC entity receives negative acknowledgment information (NACK), which is fed back by the receiver MAC entity, of the MAC data packet to which the RLC data (for example, 3 pieces of RLC data) packet belongs, and the number of received NACKs reaches a maximum number of transmission times, the sender MAC entity generates local negative acknowledgment information (Local NACK), indicating that the transmission of the RLC data packet fails.

Specifically, the sender MAC entity may specifically determine, by using the following method, the MAC data packet to which the RLC data packet belongs because the RLC data packet uniquely corresponds to one logical channel identity (LCID for short), the sender MAC entity may determine, according to an LCID in a sub-header of the MAC data packet, an RLC data packet corresponding to the LCID, thereby determining the MAC data packet to which the RLC data packet belongs. After receiving the local acknowledgment information (Local ACK) of the RLC data packet, the RLC AM entity sender determines that the transmission of the RLC data packet is successful and may execute a related operation to be performed after receiving positive acknowledgment information (ACK) of the RLC data packet that is fed back by the RLC AM entity receiver in the prior art.

For example, if one complete RLC service data unit (SDU for short) to which the RLC data packet belongs is transmitted successfully, the RLC AM entity sender notifies a packet data convergence protocol (PDCP for short) layer; and after receiving the local negative acknowledgment information (Local NACK) of the RLC data packet, the RLC AM entity sender determines that the transmission of the RLC data packet fails and may execute a related operation to be performed after receiving negative acknowledgment information (NACK) of the RLC data packet that is fed back by the RLC AM entity receiver in the prior art, for example, prepare to retransmit the RLC data packet that fails in the transmission.

Optionally, after 102, the RLC AM entity sender may further receive sixth indication information sent by the RRC layer. The sixth indication information is used to instruct the RLC AM entity sender to stop prohibiting the RLC AM entity receiver from feeding back the acknowledgment information of the RLC data packet. The sixth indication information is sent by the RRC layer according to obtained seventh indication information, and the seventh indication information is used to instruct the RLC AM entity sender to stop prohibiting the RLC AM entity receiver from feeding back the acknowledgment information of the RLC data packet.

Correspondingly, in this embodiment, the RLC AM entity sender may not execute 101 according to the sixth indication information, that is, not execute the sending an RLC data packet to an RLC AM entity receiver through a sender MAC entity and a receiver MAC entity.

It should be noted that, the seventh indication information may be specific to an RB, or may be specific to a user equipment. If specific to an RB, an RLC AM entity sender corresponding to the RB may be instructed to stop prohibiting a corresponding RLC AM entity receiver from feeding back the acknowledgment information of the RLC data packet; and if specific to a user equipment, all RLC AM entity senders of the user equipment may be instructed to stop prohibiting a corresponding RLC AM entity receiver from feeding back the acknowledgment information of the RLC data packet.

Optionally, the RRC layer may specifically obtain the seventh indication information by using a dedicated message. The dedicated message may be an existing RRC message, that is, a new field is added to the existing RRC message. Alternatively, the dedicated message may be a new RRC message, which is not limited in this embodiment. For example, assuming that the RLC AM entity sender is located in a user equipment and the RLC AM entity receiver is located in a base station, the base station may send an RRC message to the user equipment, where the RRC message includes the seventh indication information. After receiving the RRC message sent by the base station, an RRC layer of the user equipment may send the sixth indication information to the RLC AM entity sender according to the seventh indication information included in the RRC message. The foregoing RRC message may include but is not limited to an RRC connection setup message, an RRC connection reconfiguration message, or an RRC connection reestablishment message.

Optionally, in another embodiment of the present invention, the RLC AM entity sender may further send eighth indication information to the sender MAC entity. The eighth indication information is used to instruct the sender MAC entity to stop feeding back the local acknowledgment information of the RLC data packet to the RLC AM entity sender.

Optionally, in another embodiment of the present invention, the RRC layer may send the eighth indication information to the sender MAC entity according to obtained ninth indication information, where the ninth indication information is used to instruct the sender MAC entity to stop feeding back the local acknowledgment information of the RLC data packet to the RLC AM entity sender. Optionally, the RRC layer may specifically obtain the ninth indication information by using a dedicated message. The dedicated message may be an existing RRC message, that is, a new field is added to the existing RRC message. Alternatively, the dedicated message may be a new RRC message, which is not limited in this embodiment. For example, assuming that the RLC AM entity sender and the sender MAC entity are located in a user equipment, and the RLC AM entity receiver is located in a base station, the base station may send an RRC message to the user equipment, where the RRC message includes the ninth indication information. After receiving the RRC message sent by the base station, an RRC layer of the user equipment may send the eighth indication information to the sender MAC entity according to the ninth indication information included in the RRC message. The foregoing RRC message may include but is not limited to an RRC connection setup message, an RRC connection reconfiguration message, or an RRC connection reestablishment message.

In this embodiment, an RLC AM entity sender sends an RLC data packet including first indication information to an RLC AM entity receiver through a sender MAC entity and a receiver MAC entity, instructing the RLC AM entity receiver not to feed back acknowledgment information of the RLC data packet, and receives local acknowledgment information of the RLC data packet that is fed back by the sender MAC entity, so that the RLC AM entity sender can determine whether the transmission of the transmitted packet is successful, which can avoid a problem in the prior art that great signaling overhead is generated due to the transmission of acknowledgment information corresponding to an RLC data packet, thereby reducing signaling overhead and saving transmission resources.

In another embodiment of the present invention, in consideration that in an intelligent application of a user equipment, the user equipment or a base station usually transmits one independent RLC data packet, that is, transmits only one RLC data packet in a long time interval. However, in order to transmit the foregoing acknowledgment information corresponding to the independent RLC data packet, great signaling overhead is generated, and the signaling overhead is much greater than the transmitted independent RLC data packet. Therefore, in this embodiment, only when the RLC data packet to be transmitted is an independent RLC data packet, the RLC AM entity sender executes the technical solution in the embodiment corresponding to FIG. 1. For details, reference may be made to the embodiments corresponding to FIG. 2 and FIG. 3.

Figure 2:
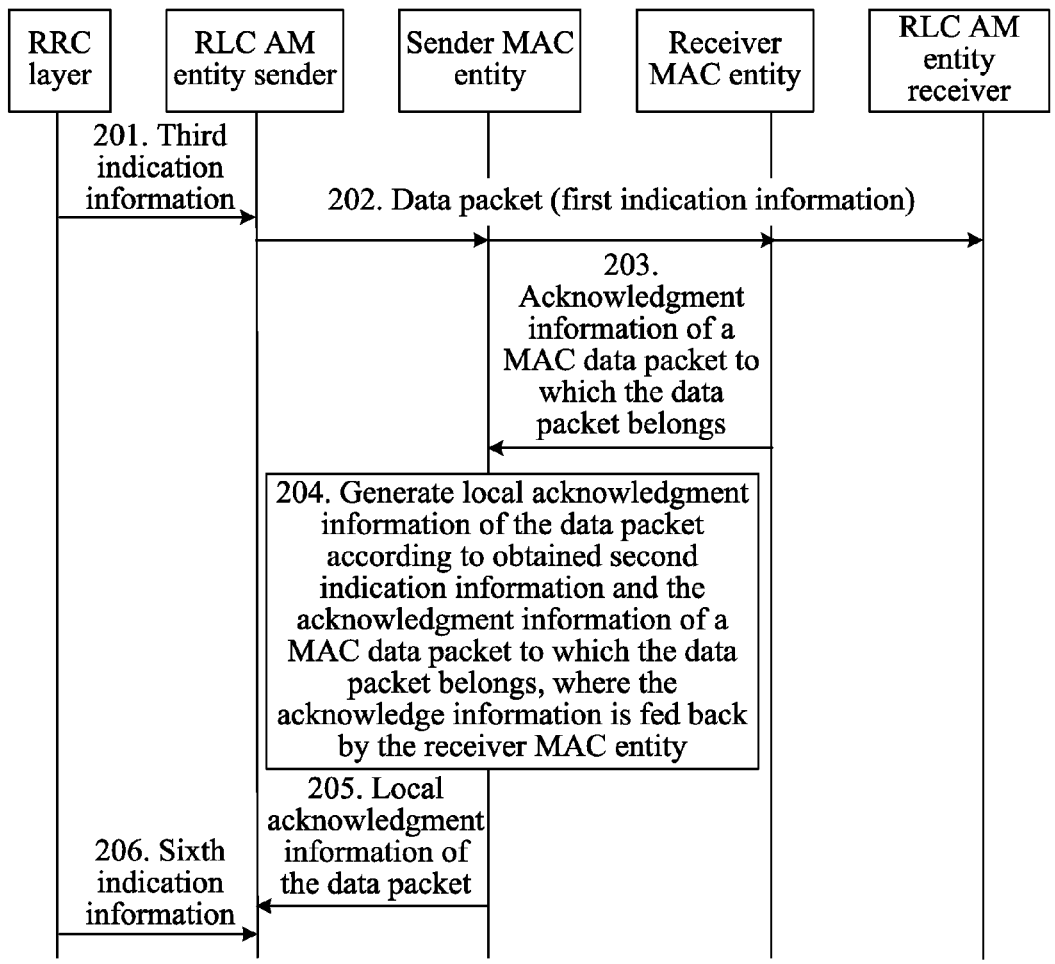
FIG. 2 is a schematic flowchart of a method for acknowledging RLC data packet transmission according to another embodiment of the present invention.

FIG. 2 is a schematic flowchart of a method for acknowledging RLC data packet transmission according to another embodiment of the present invention. As shown in FIG. 2, the method for acknowledging RLC data packet transmission in this embodiment may include the following steps.

201: An RLC AM entity sender receives third indication information sent by an RRC layer. The third indication information is used to instruct the RLC AM entity sender to prohibit an RLC AM entity receiver from feeding back acknowledgment information of an RLC data packet.

The third indication information is sent by the RRC layer according to obtained fourth indication information. The fourth indication information is used to instruct the RLC AM entity sender to prohibit the RLC AM entity receiver from feeding back the acknowledgment information of the RLC data packet.

For a detailed description, reference may be made to related content in the embodiment corresponding to FIG. 1.

Specifically, the RLC data packet may include an RLC AMD PDU or an RLC AMD PDU segment.

202: If an RLC data packet to be transmitted is an independent RLC data packet, the RLC AM entity sender sends, to the RLC AM entity receiver through a sender MAC entity and a receiver MAC entity, the RLC data packet to be transmitted. The RLC data packet includes first indication information, and the first indication information is used to instruct the RLC AM entity receiver not to feed back acknowledgment information of the RLC data packet.

For example, if a counter PDU_WITHOUT_POLL is 1, and only the RLC data packet exists in a buffer, it indicates that the RLC data packet is an independent RLC data packet. That is to say, the RLC data packet is both a first RLC data packet to be transmitted in a current buffer, and a last RLC data packet to be transmitted in the current buffer.

It can be understood that, after the RLC AM entity sender detects that the RLC AM entity sender sends the RLC data packet completely, the foregoing buffer is empty, that is, both a new transmission data buffer and a retransmission data buffer are empty. The retransmission data buffer is empty means that the retransmission data buffer does not include an RLC data packet that has been sent and for which local acknowledgment information is waited for.

So far, the RLC AM entity receiver does not feed back the acknowledgment information of the RLC data packet to the RLC AM entity sender.

203: The receiver MAC entity feeds back, to the sender MAC entity, acknowledgment information of a MAC data packet to which the RLC data packet belongs.

204: The sender MAC entity generates local acknowledgment information of the RLC data packet according to obtained second indication information and the acknowledgment information of the MAC data packet to which the RLC data packet belongs, where the acknowledgment information is fed back by the receiver MAC entity.

Optionally, before 204, the RLC AM entity sender may further send the second indication information to the sender MAC entity, where the second indication information is used to instruct the sender MAC entity to feed back the local acknowledgment information of the RLC data packet to the RLC AM entity sender.

Optionally, before 204, the RRC layer may further send the second indication information to the sender MAC entity according to obtained fifth indication information. The fifth indication information is used to instruct the sender MAC entity to feed back the local acknowledgment information of the RLC data packet to the RLC AM entity sender.

205: The sender MAC entity feeds back the local acknowledgment information of the RLC data packet to the RLC AM entity sender.

For a detailed description, reference may be made to related content in the embodiment corresponding to FIG. 1.

206: The RLC AM entity sender receives sixth indication information sent by the RRC layer. The sixth indication information is used to instruct the RLC AM entity sender to stop prohibiting the RLC AM entity receiver from feeding back the acknowledgment information of the RLC data packet.

The sixth indication information is sent by the RRC layer according to obtained seventh indication information. The seventh indication information is used to instruct the RLC AM entity sender to stop prohibiting the RLC AM entity receiver from feeding back the acknowledgment information of the RLC data packet.

So far, the RLC AM entity receiver continues to feed back the acknowledgment information of the RLC data packet to the RLC AM entity sender according to a method in an existing standard.

Optionally, after 206, the RLC AM entity sender may further send eighth indication information to the sender MAC entity. The eighth indication information is used to instruct the sender MAC entity to stop feeding back the local acknowledgment information of the RLC data packet to the RLC AM entity sender.

Optionally, before 206, in 206, or after 206, the RRC layer may further send the eighth indication information to the sender MAC entity according to obtained ninth indication information. The ninth indication information is used to instruct the sender MAC entity to stop feeding back the local acknowledgment information of the RLC data packet to the RLC AM entity sender.

For a detailed description, reference may be made to related content in the embodiment corresponding to FIG. 1.

In this embodiment, after receiving indication information that is sent by an RRC layer and used to prohibit an RLC AM entity receiver from feeding back acknowledgment information of an RLC data packet, and when determining that an RLC data packet to be transmitted is an independent RLC data packet, an RLC AM entity sender sends an RLC data packet to be transmitted, which includes first indication information, to the RLC AM entity receiver through a sender MAC entity and a receiver MAC entity, instructing the RLC AM entity receiver not to feed back the acknowledgment information of the RLC data packet, and receives local acknowledgment information of the RLC data packet that is fed back by the sender MAC entity, so that the RLC AM entity sender can determine whether the transmission of the transmitted packet is successful, which can avoid a problem in the prior art that signaling overhead much greater than the independent RLC data packet are generated due to the transmission of acknowledgment information corresponding to the independent RLC data packet, thereby reducing signaling overhead and saving transmission resources.

In the embodiments corresponding to FIG. 1 and FIG. 2, if the sender MAC entity misunderstands a received hybrid automatic repeat request (HARQ) NACK of a MAC PDU bearing an AMD PDU or an AMD PDU segment as an HARQ ACK, the sender MAC entity forwards the HARQ ACK indication to an RLC AM entity sender corresponding to the AMD PDU or the AMD PDU segment, the RLC AM entity sender considers that the AMD PDU or the AMD PDU segment is sent successfully. However, the actual corresponding RLC AM entity receiver does not actually receive the AMD PDU or the AMD PDU segment, and triggers to send a status report after a timer t_Reordering times out. After receiving the STATUS Report, the RLC AM entity sender finds that an SN of the AMD PDU or the AMD PDU segment with feedback being NACK is not in a send window, thereby leading to an exception in an automatic repeat request mechanism. To avoid the foregoing problem, the present invention further provides the following embodiments:

Optionally, the embodiment corresponding to FIG. 1 or FIG. 2 further includes the following.

For uplink HARQ feedback of a downlink data packet, that is, in a case where a sender of the data packet is a base station, a receiver of the data packet is a user equipment, and the user equipment performs uplink HARQ feedback to the base station, when the RLC AM entity sender sends the RLC data packet to the RLC AM entity receiver through the sender MAC entity and the receiver MAC entity. The RLC data packet includes the first indication information, an RRC layer of the sender sends tenth indication information to the receiver by using an RRC message. The tenth indication information is used to instruct the receiver MAC entity to start a corresponding uplink HARQ feedback repeat mechanism. After receiving the tenth indication information, an RRC layer of the receiver notifies the receiver MAC entity of the tenth indication information.

Optionally, in the embodiment corresponding to FIG. 1 or FIG. 2, for downlink HARQ feedback of an uplink data packet, that is, in a case where a sender of the data packet is a user equipment, a receiver of the data packet is a base station, and the base station performs downlink HARQ feedback to the user equipment, the sender MAC entity includes a variable HARQ_FEEDBACK, and latest acknowledgment information of the MAC data packet to which the RLC data packet belongs, where the acknowledgment information is fed back by the receiver MAC entity, is stored in the HARQ_FEEDBACK. The local acknowledgment information is a value in the variable HARQ_FEEDBACK.

A manner for the sender MAC entity to submit the local acknowledgment information to the RLC AM entity sender includes the following.

Manner 1: The sender MAC entity submits the local acknowledgment information after receiving the acknowledgment information of the receiver MAC entity.

Manner 2: When an HARQ buffer of an HARQ process corresponding to a MAC PDU bearing the AMD PDU or the AMD PDU segment is emptied or the MAC PDU is replaced by a new MAC PDU, a variable HARQ_FEEDBACK stored before the HARQ buffer is emptied or the MAC PDU is replaced by a new MAC PDU is submitted to an RLC AM entity sender corresponding to the AMD PDU or the AMD PDU segment, as the local acknowledgment information.

For example, after it is recorded that the number of transmission times of the MAC PDU reaches a specified value, or after the sender MAC entity receives an ACK feedback of the receiver MAC entity, the HARQ buffer of the HARQ process corresponding to the MAC PDU bearing the AMD PDU or the AMD PDU segment is emptied. For example, when the HARQ process executes new transmission, the MAC PDU corresponding to the HARQ buffer of the HARQ process and bearing the AMD PDU or the AMD PDU segment is replaced by a new MAC PDU.

In a process where the sender MAC entity submits the HARQ_FEEDBACK to the corresponding RLC AM entity sender, correspondence between the MAC PDU or a process where the MAC PDU is located and the AMD PDU or the AMD PDU segment needs to be recorded, so that after receiving the HARQ_FEEDBACK, the RLC AM entity sender processes the corresponding AMD PDU or AMD PDU segment, for example, performs a discard operation. Specifically, it may be implemented in the following manners.

Manner 1: When sending the AMD PDU or the AMD PDU segment to the sender MAC entity, the RLC AM entity sender notifies a sequence number (SN) corresponding to the AMD PDU or the AMD PDU segment, or an SN and bit offset information (So Start/So end); and when submitting the HARQ_FEEDBACK to the corresponding RLC AM entity sender, the sender MAC entity further submits, to the RLC AM entity sender, corresponding information of the AMD PDU or the AMD PDU segment previously sent by the RLC AM entity sender. The RLC AM entity sender performs processing according to the corresponding information.

Manner 2: When instructing the corresponding RLC AM entity sender to assemble the AMD PDU or the AMD PDU segment, the sender MAC entity also notifies the RLC AM entity sender of a used HARQ process number; and when submitting the HARQ_FEEDBACK to the corresponding RLC AM entity sender, the sender MAC entity carries a corresponding HARQ process number. The RLC AM entity sender performs processing according to the corresponding information.

By using the foregoing methods, reliability of the HARQ feedback is enhanced, and misunderstanding of the HARQ feedback is avoided as much as possible. However, if once the HARQ feedback is misunderstood, especially the HARQ NACK is decoded as the HARQ ACK, the RLC AM entity sender still receives the misunderstood HARQ feedback. Therefore, an embodiment of the present invention further provides an HARQ fault tolerance mechanism.

Optionally, the embodiment corresponding to FIG. 1 or FIG. 2 further includes the following.

For sending of an uplink data packet, that is, a user equipment serves as a sender, if one or more RLC AM entity senders of the user equipment receive a STATUS Report, and an SN of the AMD PDU or the AMD PDU segment with feedback being NACK in the STATUS Report is not in a send window, the RLC AM entity sender of the user equipment instructs an RRC layer of the user equipment to initiate an RRC connection reestablishment procedure, and set a reestablishment cause to otherFailure.

For sending of a downlink data packet, that is, a base station serves as a sender, if one or more RLC AM entity senders of the base station receive a STATUS Report, and an SN of the AMD PDU or the AMD PDU segment with feedback being NACK is not in a send window, the RLC AM entity sender of the base station instructs an RRC layer of the base station to initiate an RRC connection release procedure, or triggers the UE to initiate an RRC connection reestablishment procedure. A triggering manner may be sending an existing message to the user equipment, or adding a new information element into an existing message, or sending a new message to the user equipment.

The technical solutions of the present invention may be applied to various communication systems, such as a General Packet Radio Service (GPRS for short) system, a Wideband Code Division Multiple Access (WCDMA for short) system, and a Long Term Evolution (LTE for short) system.

It should be noted that, for ease of description, the foregoing method embodiments are all described as a series of actions. Persons skilled in the art should understand that the present invention is not limited to the sequence of actions described herein, and some steps may be performed in another sequence or performed at the same time according to the present invention. Persons skilled in the art should also know that the embodiments in the specification are exemplary embodiments and involved actions and modules are not necessarily required in the present invention.

In the foregoing embodiments, the description in each embodiment has respective focus. For a part that is not described in a certain embodiment, reference may be made to related descriptions in other embodiments.

Figure 3:
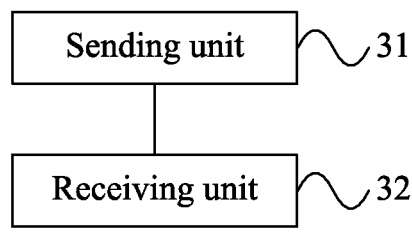
FIG. 3 is a schematic structural diagram of an RLC AM entity sender according to another embodiment of the present invention.

FIG. 3 is a schematic structural diagram of an RLC AM entity sender according to another embodiment of the present invention. As shown in FIG. 3, the RLC AM entity sender in this embodiment may include a sending unit 31 and a receiving unit 32. The sending unit 31 is configured to send an RLC data packet to an RLC AM entity receiver through a sender MAC entity and a receiver MAC entity. The RLC data packet includes first indication information, wherein is used to instruct the RLC AM entity receiver not to feed back acknowledgment information of the RLC data packet. The receiving unit 32 is configured to receive local acknowledgment information of the RLC data packet that is fed back by the sender MAC entity. The local acknowledgment information of the RLC data packet is generated by the sender MAC entity according to acknowledgment information of a MAC data packet to which the RLC data packet belongs. The acknowledge information of the MAC data packet is fed back by the receiver MAC entity. The local acknowledgment information of the RLC data packet is fed back by the sender MAC entity according to obtained second indication information and the second indication information is used to instruct the sender MAC entity to feed back the local acknowledgment information of the RLC data packet to the RLC AM entity sender.

The functions of the RLC AM entity sender in the foregoing embodiments corresponding to FIG. 1 and FIG. 2 are all provided by this embodiment.

Optionally, in this embodiment, that the RLC data packet sent by the sending unit 31 includes first indication information indicating that the RLC data packet includes a feedback prohibition indication. Alternatively the RLC data packet includes a polling indication domain. When a value of the polling indication domain is a first value, it indicates feedback prohibited and when the value of the polling indication domain is a second value, it indicates polling, which is not limited in this embodiment.

Optionally, the receiving unit 32 in this embodiment may further receive third indication information sent by an RRC layer. The third indication information is used to instruct the RLC AM entity sender to prohibit the RLC AM entity receiver from feeding back the acknowledgment information of the RLC data packet. The third indication information is sent by the RRC layer according to obtained fourth indication information. The fourth indication information is used to instruct the RLC AM entity sender to prohibit the RLC AM entity receiver from feeding back the acknowledgment information of the RLC data packet.

Correspondingly, the sending unit 31 may specifically send the RLC data packet to the RLC AM entity receiver through the sender MAC entity and the receiver MAC entity according to the third indication information.

Optionally, the receiving unit 32 in this embodiment may further receive sixth indication information sent by the RRC layer. The sixth indication information is used to instruct the RLC AM entity sender to stop prohibiting the RLC AM entity receiver from feeding back the acknowledgment information of the RLC data packet. The sixth indication information is sent by the RRC layer according to obtained seventh indication information. The seventh indication information is used to instruct the RLC AM entity sender to stop prohibiting the RLC AM entity receiver from feeding back the acknowledgment information of the RLC data packet.

Correspondingly, the sending unit 31 may not execute, according to the sixth indication information, the sending an RLC data packet to an RLC AM entity receiver through a sender MAC entity and a receiver MAC entity.

Optionally, the sending unit 31 in this embodiment may further send the second indication information to the sender MAC entity.

Optionally, the sending unit 31 in this embodiment may further send eighth indication information to the sender MAC entity. The eighth indication information is used to instruct the sender MAC entity to stop feeding back the local acknowledgment information of the RLC data packet to the RLC AM entity sender.

Figure 4:
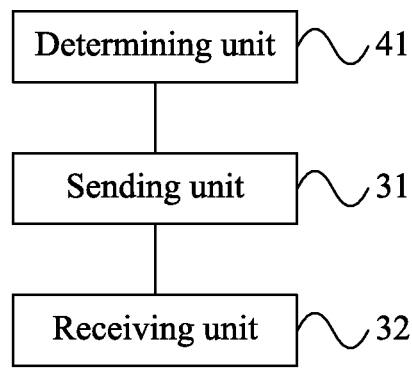
FIG. 4 is a schematic structural diagram of an RLC AM entity sender according to another embodiment of the present invention.

Optionally, as shown in FIG. 4, the RLC AM entity sender in this embodiment may further include a determining unit 41, configured to determine that the RLC data packet is an independent RLC data packet.

Specifically, if a counter PDU_WITHOUT_POLL is 1, and only the RLC data packet exists in a buffer, the determining unit 41 may specifically determine that the RLC data packet is an independent RLC data packet.

Optionally, when the RLC data packet sent by the RLC AM entity is an uplink data packet, if the receiving unit 32 receives a status report STATUS Report, and an SN of an AMD PDU or an AMD PDU segment with feedback being NACK in the status report is not in a send window, the sending unit 31 instructs the RRC layer to initiate an RRC connection reestablishment procedure, and set a reestablishment cause to otherFailure.

When the RLC data packet sent by the RLC AM entity is a downlink data packet, if the receiving unit 32 receives a STATUS Report, and an SN of an AMD PDU or an AMD PDU segment with feedback being NACK in the status report is not in a send window, the sending unit 31 instructs the RRC layer to initiate an RRC connection release procedure, or triggers the receiver to initiate an RRC connection reestablishment procedure.

In this embodiment, an RLC AM entity sender sends, using a sending unit, an RLC data packet including first indication information to an RLC AM entity receiver through a sender MAC entity and a receiver MAC entity, instructing the RLC AM entity receiver not to feed back acknowledgment information of the RLC data packet. The RLC AM entity receives, by using a receiving unit, local acknowledgment information of the RLC data packet that is fed back by the sender MAC entity, so that the RLC AM entity sender can determine whether the transmission of the transmitted packet is successful. This can avoid a problem in the prior art that great signaling overhead is generated due to the transmission of acknowledgment information corresponding to an RLC data packet, thereby reducing signaling overhead and saving transmission resources.

In the several embodiments provided in the present application, it should be understood that the disclosed system, apparatus, and method may be implemented in other manners. For example, the described apparatus embodiment is merely exemplary. For example, dividing of the units is merely a type of logical function dividing, and there may be other dividing manners during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, various functional units in the embodiments of the present invention may be integrated into one processing unit, or the units may exist physically as separate units, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform a part of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions recorded in the foregoing embodiments or make equivalent replacements to part of technical features of the technical solutions recorded in the foregoing embodiments. However, these modifications or replacements do not make the essence of corresponding technical solutions to depart from the spirit and scope of the technical solutions of the embodiments of the present invention.

What is claimed is:

1. A method for acknowledging radio link control (RLC) data packet transmission, the method comprising:
   sending, by an RLC acknowledged mode (AM) entity sender, an RLC data packet to an RLC AM entity receiver through a sender medium access control (MAC) entity and a receiver MAC entity, wherein the RLC data packet comprises first indication information, which is used to instruct the RLC AM entity receiver not to feed back acknowledgment information of the RLC data packet; and
   receiving, by the RLC AM entity sender, local acknowledgment information of the RLC data packet that is fed back by the sender MAC entity, wherein the local acknowledgment information of the RLC data packet is generated by the sender MAC entity according to acknowledgment information of a MAC data packet to which the RLC data packet belongs, wherein the acknowledge information of the MAC data packet being fed back by the receiver MAC entity;
   wherein the local acknowledgment information of the RLC data packet is fed back by the sender MAC entity according to obtained second indication information, which is used to instruct the sender MAC entity to feed back the local acknowledgment information of the RLC data packet to the RLC AM entity sender.

2. The method according to claim 1, wherein the first indication information is a feedback prohibition indication or a polling indication domain, wherein a first value of the polling indication domain indicates that feedback prohibited, and a second value of the polling indication indicates polling.

3. The method according to claim 1, wherein before sending the RLC data packet to the RLC AM entity receiver through the sender MAC entity and the receiver MAC entity, the method further comprises:
   receiving, by the RLC AM entity sender, third indication information sent by a radio resource control (RRC) layer, wherein the third indication information is used to instruct the RLC AM entity sender to prohibit the RLC AM entity receiver from feeding back the acknowledgment information of the RLC data packet;
   wherein the third indication information is sent by the RRC layer according to obtained fourth indication information, which is used to instruct the RLC AM entity sender to prohibit the RLC AM entity receiver from feeding back the acknowledgment information of the RLC data packet; and which sending, the RLC data packet to the RLC AM entity receiver through the sender MAC entity and the receiver MAC entity comprises sending, by the RLC AM entity sender according to the third indication information, the RLC data packet to the RLC AM entity receiver through the sender MAC entity and the receiver MAC entity.

4. The method according to claim 3, wherein after receiving, the local acknowledgment information of the RLC data packet that is fed back by the sender MAC entity, the method further comprises:

receiving, by the RLC AM entity sender, sixth indication information sent by the RRC layer, wherein the sixth indication information is used to instruct the RLC AM entity sender to stop prohibiting the RLC AM entity receiver from feeding back the acknowledgment information of the RLC data packet;

wherein the sixth indication information is sent by the RRC layer according to obtained seventh indication information, which is used to instruct the RLC AM entity sender to stop prohibiting the RLC AM entity receiver from feeding back the acknowledgment information of the RLC data packet.

5. The method according to claim 1, wherein the method further comprises:

sending, by the RLC AM entity sender, the second indication information to the sender MAC entity; or sending, by an RRC layer according to obtained fifth indication information, the second indication information to the sender MAC entity, wherein the fifth indication information is used to instruct the sender MAC entity to feed back the local acknowledgment information of the RLC data packet to the RLC AM entity sender.

6. The method according to claim 5, wherein after receiving, the local acknowledgment information of the RLC data packet that is fed back by the sender MAC entity, the method further comprises:

sending, by the RLC AM entity sender, eighth indication information to the sender MAC entity, wherein the eighth indication information is used to instruct the sender MAC entity to stop feeding back the local acknowledgment information of the RLC data packet to the RLC AM entity sender; or sending, by the RRC layer according to obtained ninth indication information, eighth indication information to the sender MAC entity, wherein the ninth indication information is used to instruct the sender MAC entity to stop feeding back the local acknowledgment information of the RLC data packet to the RLC AM entity sender.

7. The method according to claim 1, wherein before sending the RLC data packet to the RLC AM entity receiver through the sender MAC entity and the receiver MAC entity, the method further comprises determining, by the RLC AM entity sender, that the RLC data packet is an independent RLC data packet.

8. The method according to claim 7, wherein determining, that the RLC data packet is an independent RLC data packet comprises determining that a counter PDU_WITHOUT_POLL is 1, and only the RLC data packet exists in a buffer.

9. The method according to claim 1, wherein when the RLC data packet sent by the RLC AM entity is a downlink data packet, the method further comprises sending, by an RRC layer of a sender, tenth indication information to a receiver by using an RRC message, wherein the tenth indication information is used to instruct the receiver MAC entity to start a corresponding uplink hybrid automatic repeat request (HARQ) feedback repeat mechanism.

10. The method according to claim 1, wherein when the RLC data packet sent by the RLC AM entity is an uplink data packet and before receiving, the local acknowledgment information of the RLC data packet that is fed back by the sender MAC entity, the method further comprises:

submitting, by the sender MAC entity, the local acknowledgment information after receiving the acknowledgment information of the receiver MAC entity; or when an HARQ buffer of an HARQ process corresponding to a MAC PDU bearing an AMD PDU or an AMD PDU segment is emptied or the MAC PDU is replaced by a new MAC PDU, submitting, by the sender MAC entity, a variable HARQ_FEEDBACK stored before the HARQ buffer is emptied or the MAC PDU is replaced by a new MAC PDU, as the local acknowledgment information, to an RLC AM entity sender corresponding to the AMD PDU or the AMD PDU segment.

11. The method according to claim 10, wherein, when the RLC data packet sent by the RLC AM entity sender is an uplink data packet, if the RLC AM entity sender receives a status report, and an SN of the AMD PDU or the AMD PDU segment with feedback being NACK in the status report is not in a send window, the RLC AM entity sender instructs the RRC layer to initiate an RRC connection reestablishment procedure, and set a reestablishment cause to otherFailure; and when the RLC data packet sent by the RLC AM entity sender is a downlink data packet, if the RLC AM entity sender receives a status report, and an sequence number (SN) of the AMD PDU or the AMD PDU segment with feedback being NACK in the status report is not in a send window, the RLC AM entity sender instructs the RRC layer to initiate an RRC connection release procedure, or triggers a receiver to initiate an RRC connection reestablishment procedure.

12. A radio link control (RLC) acknowledged mode (AM) entity sender, comprising:

a sending unit, configured to send an RLC data packet to an RLC AM entity receiver through a sender medium access control (MAC) entity and a receiver MAC entity, wherein the RLC data packet comprises first indication information, which is used to instruct the RLC AM entity receiver not to feed back acknowledgment information of the RLC data packet; and a receiving unit, configured to receive local acknowledgment information of the RLC data packet that is fed back by the sender MAC entity, wherein the local acknowledgment information of the RLC data packet is generated by the sender MAC entity according to acknowledgment information of a MAC data packet to which the RLC data packet belongs, wherein the acknowledge information of the MAC data packet is fed back by the receiver MAC entity;

wherein the local acknowledgment information of the RLC data packet is fed back by the sender MAC entity according to obtained second indication information, and the second indication information is used to instruct the sender MAC entity to feed back the local acknowledgment information of the RLC data packet to the RLC AM entity sender.

13. The RLC AM entity sender according to claim 12, wherein the first indication information is a feedback prohibition indication or a polling indication domain, wherein a first value of the polling indication domain indicates that feedback prohibited and a second value of the polling indication domain indicates polling.

14. The RLC AM entity sender according to claim 12, wherein the receiving unit is further configured to receive third indication information sent by a radio resource control (RRC) layer, wherein the third indication information is used to instruct the RLC AM entity sender to prohibit the RLC AM entity receiver from feeding back the acknowledgment information of the RLC data packet;
wherein the third indication information is sent by the RRC layer according to obtained fourth indication information, which is used to instruct the RLC AM entity sender to prohibit the RLC AM entity receiver from feeding back the acknowledgment information of the RLC data packet; and
wherein the sending unit is specifically configured to send the RLC data packet to the RLC AM entity receiver through the sender MAC entity and the receiver MAC entity according to the third indication information.

15. The RLC AM entity sender according to claim 14, wherein the receiving unit is further configured to:
receive sixth indication information sent by the RRC layer, wherein the sixth indication information is used to instruct the RLC AM entity sender to stop prohibiting the RLC AM entity receiver from feeding back the acknowledgment information of the RLC data packet;
wherein the sixth indication information is sent by the RRC layer according to obtained seventh indication information, which is used to instruct the RLC AM entity sender to stop prohibiting the RLC AM entity receiver from feeding back the acknowledgment information of the RLC data packet.

16. The RLC AM entity sender according to claim 12, wherein the sending unit is further configured to send the second indication information to the sender MAC entity.

17. The RLC AM entity sender according to claim 16, wherein the sending unit is further configured to send eighth indication information to the sender MAC entity, wherein the eighth indication information is used to instruct the sender MAC entity to stop feeding back the local acknowledgment information of the RLC data packet to the RLC AM entity sender.

18. The RLC AM entity sender according to claim 12, wherein the RLC AM entity sender further comprises a determining unit, configured to determine that the RLC data packet is an independent RLC data packet.

19. The RLC AM entity sender according to claim 18, wherein the determining unit is specifically configured to determine that the RLC data packet is an independent RLC data packet when a counter PDU_WITHOUT_POLL is 1, and only the RLC data packet exists in a buffer.

20. The RLC AM entity sender according to claim 12, wherein,
when the RLC data packet sent by the sending unit is an uplink data packet, if the receiving unit receives a status report, and an SN of an AMD PDU or an AMD PDU segment with feedback being NACK in the status report is not in a send window, the sending unit instructs an RRC layer to initiate an RRC connection reestablishment procedure, and set a reestablishment cause to otherFailure; and
when the RLC data packet sent by the sending unit is a downlink data packet, if the receiving unit receives a status report, and an sequence number (SN) of an AMD PDU or an AMD PDU segment with feedback being NACK in the status report is not in a send window, the sending unit instructs an RRC layer to initiate an RRC connection release procedure, or triggers a receiver to initiate an RRC connection reestablishment procedure.

* * * * *